Sept. 15, 1964  W. J. HARMS  3,148,858
ADJUSTABLY SUPPORTED SEAT STRUCTURE
Filed Oct. 5, 1961  2 Sheets-Sheet 1

WILLIAM J. HARMS
INVENTOR.

BY John R. Faulkner
John J. Roethel
ATTORNEYS

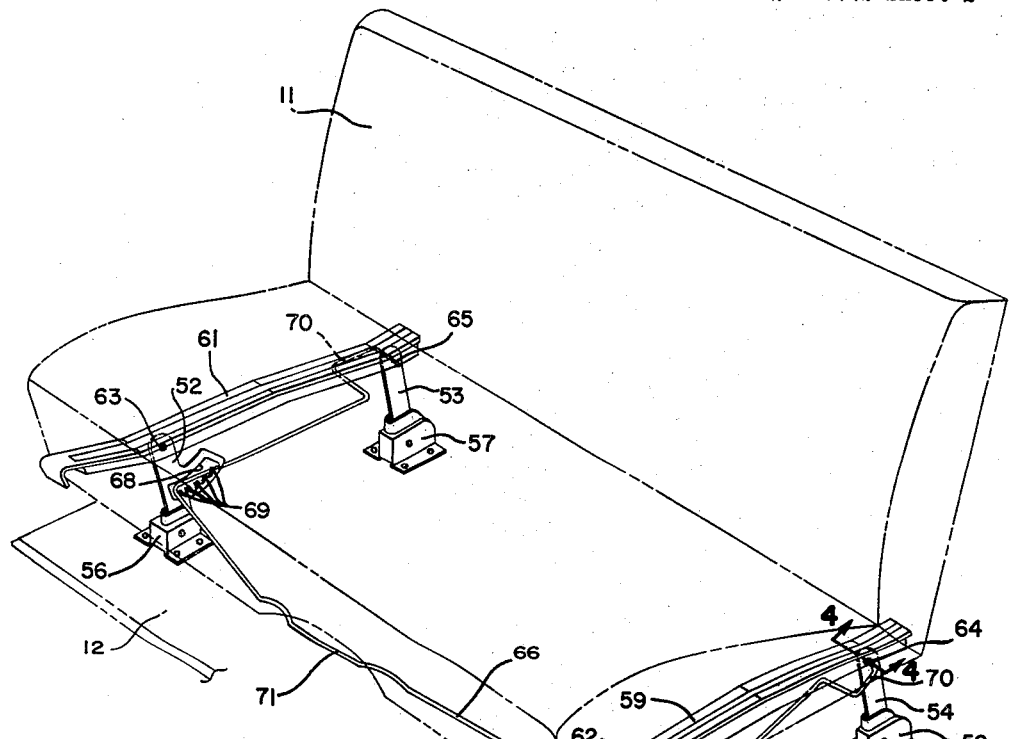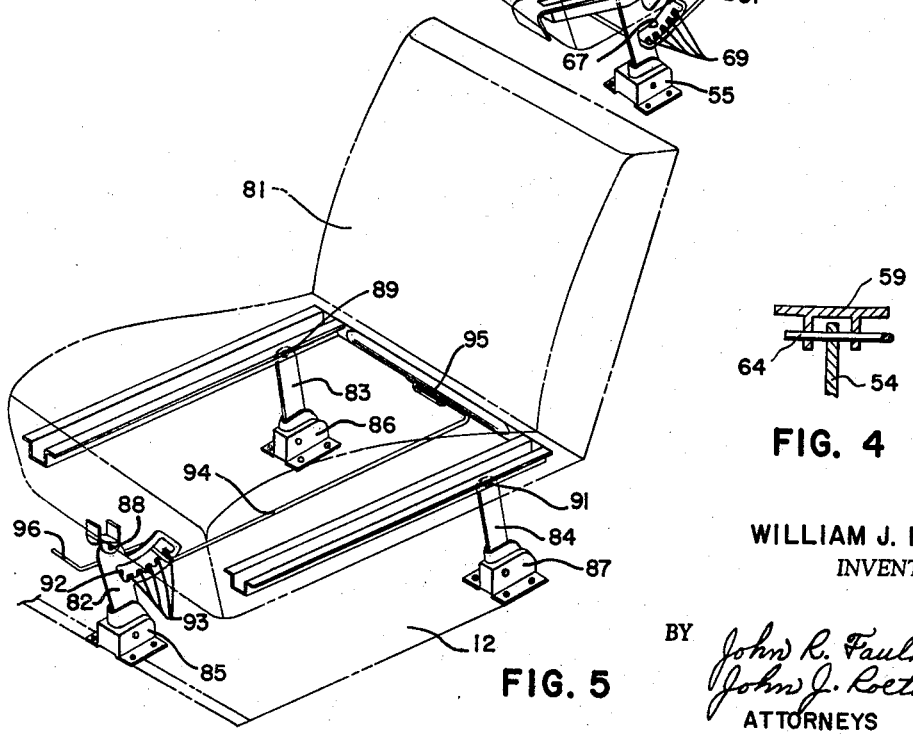

United States Patent Office 3,148,858
Patented Sept. 15, 1964

3,148,858
ADJUSTABLY SUPPORTED SEAT STRUCTURE
William J. Harms, Dearborn, Mich., assignor to Ford Motor Company, Dearborn, Mich., a corporation of Delaware
Filed Oct. 5, 1961, Ser. No. 143,166
3 Claims. (Cl. 248—419)

This invention relates to an adjustably supported seat structure particularly adapted for use in motor vehicles.

It is well known in motor vehicle construction to adjustably support the driver's seat to permit selection of the most comfortable seat position. It is additionally desirable for the supporting structure to allow simultaneous vertical and horizontal adjustment of the seat position to accommodate persons of different stature. The current trend toward compactness and economy in the automotive field has resulted in an increased demand for a simple, light weight and economical adjustable seat support and associated latch mechanism. These features should, however, be obtained without sacrificing ease of operation and positive latching action.

It is an object of the present invention to provide an adjustably supported seat structure having a simplified latching mechanism for retaining the seat structure in a selected position.

It is a further object of the present invention to provide a simplified latch mechanism that offers positive action with a minimum number of parts.

A still further object of the present invention is the provision of a latch mechanism that permits easier release and engagement.

In the several embodiments of the instant invention, the seat is supported by a plurality of links pivotally connected to the seat structure and vehicle floor structure. Pivotal movement of the links accomplishes simultaneous, vertical and horizontal seat adjustment. At least one of the supporting links is formed with a plurality of spaced teeth and a torsion bar latch is received between adjacent teeth to lock the seat in position. A part of the torsion bar extends toward the perimeter of the seat and movement of this part by the seat's occupant will release the torsion bar from between the teeth to permit adjustment of the seat position.

Further objects and advantages of this invention will become more apparent as this description proceeds particularly when considered in conjunction with the accompanying drawings, wherein:

FIGURE 3 is a perspective view of an automotive seat showing another embodiment of the instant invention.

FIGURE 4 is a cross sectional view taken along line 4—4 of FIGURE 3.

FIGURE 5 illustrates another embodiment of the invention as applied to a bucket type seat.

Figure 1:
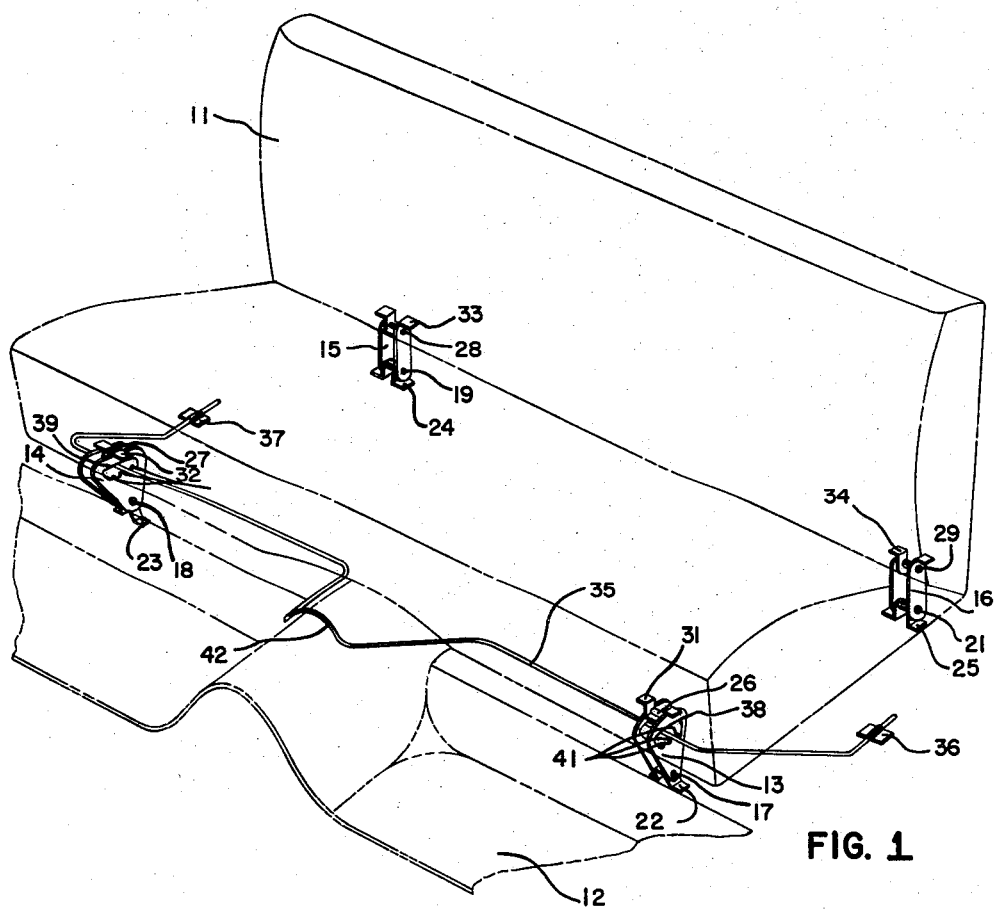
FIGURE 1 is a perspective view of an automotive seat incorporating the instant invention.
Figure 2:
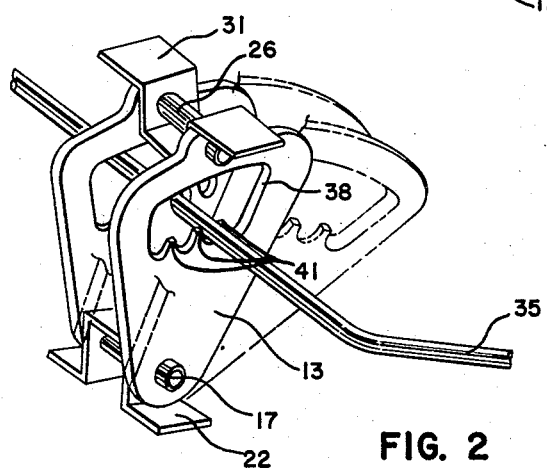
FIGURE 2 is an enlarged view of one of the front supporting links of the seat structure shown in FIGURE 1.

Referring now in detail to the drawings and in particular to the embodiment shown in FIGURES 1 and 2, a bench type automotive seat structure, indicated generally at 11, is supported above a vehicle floor structure 12. The seat structure 11 and floor structure 12 are illustrated in phantom to show the adjustable support more clearly.

Links 13, 14, 15 and 16 are positioned near each corner of the seat structure 11. Each of the links 13, 14, 15 and 16 is pivotally supported on the floor structure 12 by pins 17, 18, 19 and 21 to brackets 22, 23, 24 and 25 respectively, that are rigidly secured to the floor structure 12 in a suitable manner. The upper ends of the links 13, 14, 15 and 16 are pivotally connected by pins 26, 27, 28 and 29 to brackets 31, 32, 33 and 34 which are, in turn, rigidly secured to the seat structure 11.

The links 13, 14, 15 and 16, because of their pivotal connections to the floor structure 12 and the seat structure 11, provide a parallelogram support for the seat structure 11 to permit adjustment of the position thereof. It will be noted that movement of the seat structure 11 in a forward direction is accompanied by a simultaneous increase in the vertical position of the seat. When a person of slight stature moves the seat structure 11 forward for better access to the vehicle controls, he will also be elevated to a position offering greater visibility.

An improved latching mechanism incorporating a substantially U-shaped torsion bar 35 is utilized to lock the seat structure 11 in the adjusted position. The ends of the legs of the torsion bar 35 are rigidly secured to the floor structure 12 by clips 36 and 37. Each leg of the torsion bar 35 extends forwardly and upwardly from the clips 36 and 37 toward the front of the seat structure 11. At the forward portion of the seat structure 11 the torsion bar 35 turns inwardly into an intermediate portion that extends parallel with the front edge of the seat structure 11.

The front links 13 and 14 are formed with apertures 38 and 39 through which the intermediate portion of the torsion bar 35 extends. A plurality of radially extending teeth 41 are integrally formed in the links 13 and 14. The intermediate portion of the torsion bar 35 is received between adjacent teeth and is prestressed into engagement therewith to prevent pivotal movement of the links 13 and 14 and, accordingly, movement of the seat structure 11.

Between the links 13 and 14 the intermediate portions of the torsion bar 35 is deformed to provide a portion 42 that extends forwardly toward the perimeter of the seat structure 11. The portion 42 of the torsion bar 35 is accessible to occupants of the seat 11 and, by raising portion 42, the torsion bar 35 may be moved free of its locking action between the teeth 41 to permit adjustment of the position of the seat structure 11. When the desired position is reached, release of the portion 42 will permit the prestress of the torsion bar 35 to act to be received between another pair of the teeth 41 to lock the seat 11 in the new position.

Another embodiment of the invention is illustrated in FIGURE 3. In this embodiment, the bench type seat structure 11 is supported for adjustment relative to the floor structure 12 by links 51, 52, 53 and 54 positioned at each corner of the seat structure 11. Brackets 55, 56, 57 and 58 rigidly secured to the floor 12 pivotally support the links 51, 52, 53 and 54, respectively.

The upper ends of links 51, 52, 53 and 54 are pivotally connected to the seat structure 11. The forward links 51 and 52 are pivotally connected to seat frame members 59 and 61 by the pins 62 and 63, respectively. Ends 64 and 65 of the legs of a substantially U-shaped torsion bar 66 provide the pivotal connections between the rear links 54 and 53 and the seat frame members 59 and 61 (FIGURE 4).

From the ends 64 and 65 the legs of the torsion bar 66 extend forwardly along each side of the seat srtucture 11. Near the front links 51 and 52 the legs of the torsion bar 66 turn inwardly to extend through apertures 67 and 68 formed in links 51 and 52, respectively. A plurality of teeth 69 integrally formed in the links 51 and 52 extend into the apertures 67 and 68. U-shaped end portions 70 of the legs of the torsion bar 66 abut the underside of the seat frame members 59 and 61 to prestress the intermediate portion of the torsion bar 66 into engagement between adjacent teeth to lock the seat 11 in the adjusted position.

A portion 71 of the intermediate portion of the torsion bar 66 extends toward the perimeter of the seat 11 and movement of the portion 71 unlatches the seat structure 11 for adjustment as in the embodiment of FIGURES 1 and 2. The embodiment of FIGURE 3 also permits simultaneous vertical and horizontal adjustment.

FIGURE 5 illustrates an embodiment of the invention particularly adapted for use with a bucket type seat structure, indicated generally at 81. In this embodiment, three links 82, 83 and 84 positioned at the front edge and rear corners of the seat structure 81 provide the support.

The lower ends of the links 82, 83 and 84 are pivotally supported by the brackets 85, 86 and 87 which are secured rigidly to the floor structure 12. The upper ends of links 82, 83 and 84 are pivotally connected to the seat 81 by pins 88, 89 and 91.

The front link 82 has an aperture 92 into which extend teeth 92. A torsion bar 94 extends between adjacent teeth to lock the seat structure 81 in position. One end of the torsion bar 94 is secured by a clip 95 to the rear edge of the seat structure 81. The clip 95 secures the torsion bar 94 in a manner to prestress the torsion bar 94 into engagement with the teeth 92. A portion 96 of the torsion bar 94 extends forwardly and may be raised to release the torsion bar latch mechanism for seat adjustment.

It is to be understood that the invention is not limited to the exact constructions shown and described, but that various changes and modifications may be made without departing from the spirit and scope of the invention, as defined by the appended claims:

I claim:

1. In a vehicle body having a supporting floor structure, a seat structure, and means supporting said seat structure for combined horizontal and vertical movement, said means comprising a plurality of links interposed between said floor structure and said seat structure, a first pivotal connection between the upper end of each of said links and said seat structure, a second pivotal connection between the lower end of each of said links and said floor structure, at least one of said links having teeth formed thereon intermediate the ends thereof, latch means comprising torsion bar means having a part thereof engageable between adjacent teeth to hold said seat structure in an adjusted position, a further part of said torsion bar means forming one of said pivotal connections for at least one of said links, said torsion bar means being prestressed in the latching direction, and means on said torsion bar means accessible at the perimeter of said seat structure for deflecting said torsion bar means to move said part out of latched position.

2. In a vehicle body having a supporting floor structure, a seat structure, and means supporting said seat structure for combined horizontal and vertical movement, said means comprising a plurality of links interposed between said floor structure and said seat structure, a first pivotal connection between the upper end of each of said links and said seat structure, a second pivotal connection between the lower end of each of said links and said floor structure, the forwardmost of said links having teeth formed thereon intermediate the ends thereof, latch means comprising torsion bar means having a part thereof engageable between adjacent teeth to hold said seat structure in an adjusted position, the ends of said torsion bar means forming one of the pivotal connections for the rearwardmost of said links, said torsion bar means being prestressed in the latching direction, and means on said torsion bar means accessible at the forward edge of said seat structure for deflecting said torsion bar means to move said part out of latched position.

3. In a vehicle body having a supporting floor structure, a seat structure, and means supporting said seat structure for combined horizontal and vertical movement, said means comprising four parallel links interposed between said floor structure and said seat structure contiguous to each corner of the latter, a first pivotal connection between the upper end of each of said links and said seat structure, a second pivotal connection between the lower end of each of said links and said floor structure, the forwardmost pair of said links having teeth formed thereon intermediate the ends thereof, latch means comprising substantially U-shaped torsion bar means, the leg portions of said U-shaped torsion bar means extending in a direction substantially parallel to the sides of said seat, the ends of said leg portions forming the first pivotal connection of the rearwardmost pair of said links, the intermediate portion of said U-shaped torsion bar means extending substantially across the width of the seat at the front thereof and being engageable between adjacent teeth of said forwardmost pair of links to hold said seat structure in an adjusted position, said torsion bar means being prestressed in the latching position, and means on said torsion bar means intermediate said forwardmost pair of links accessible at the forward edge of said seat structure for deflecting said torsion bar means to move said intermediate portion out of engagement between said teeth.

References Cited in the file of this patent

UNITED STATES PATENTS 1,855,219    Brownell _____ Apr. 26, 1932

FOREIGN PATENTS 525,989    Great Britain _____ Sept. 9, 1940
699,388    Great Britain _____ Nov. 4, 1953